United States Patent
Fujinoki et al.

(10) Patent No.: US 7,764,586 B2
(45) Date of Patent: Jul. 27, 2010

(54) ABERRATION CORRECTING APPARATUS, OPTICAL PICKUP, AND ABERRATION CORRECTING METHOD

(75) Inventors: Shinichi Fujinoki, Saitama (JP); Ko Ishii, Saitama (JP)

(73) Assignee: Pioneer Corporation, Tokyo (JP)

(*) Notice: Subject to any disclaimer, the term of this patent is extended or adjusted under 35 U.S.C. 154(b) by 517 days.

(21) Appl. No.: 11/887,204

(22) PCT Filed: Mar. 29, 2006

(86) PCT No.: PCT/JP2006/306532

§ 371 (c)(1), (2), (4) Date: Oct. 12, 2007

(87) PCT Pub. No.: WO2006/104206

PCT Pub. Date: Oct. 5, 2006

(65) Prior Publication Data

US 2008/0198717 A1    Aug. 21, 2008

(51) Int. Cl.
G11B 7/135 (2006.01)
G11B 7/00 (2006.01)

(52) U.S. Cl. .................... 369/112.02; 369/44.32

(58) Field of Classification Search .......... None
See application file for complete search history.

(56) References Cited

U.S. PATENT DOCUMENTS

| | | | | |
|---|---|---|---|---|
| 5,535,179 | A * | 7/1996 | Noguchi | 369/44.35 |
| 7,542,397 | B2 * | 6/2009 | Ogasawara et al. | 369/112.02 |
| 2002/0085465 | A1 * | 7/2002 | Kobayashi | 369/112.02 |
| 2002/0172110 | A1 * | 11/2002 | Tateishi et al. | 369/44.32 |
| 2006/0007835 | A1 * | 1/2006 | Katayama | 369/112.01 |

FOREIGN PATENT DOCUMENTS

| | | |
|---|---|---|
| JP | 2001-028145 | 1/2001 |
| JP | 2002-342975 | 11/2002 |

OTHER PUBLICATIONS

International Search Report for PCT/JP2006/306532 mailed May 2, 2006.

* cited by examiner

Primary Examiner—Hoa T Nguyen
Assistant Examiner—Jesse Hauck
(74) Attorney, Agent, or Firm—Nixon & Vanderhye, P.C.

(57) ABSTRACT

A kind of an optical disc is discriminated by a disc discriminating section, an order of aberrations to be corrected is set by an order setting section by the kind of the optical disc, drive of a liquid crystal optical element is controlled by a drive control section through a liquid crystal driver, and an aberration of an optical beam is corrected based on the order of the aberration. The level of importance of the aberration correction differs by the kind of the optical disc, and the order of the aberration is set by the level of importance of the aberration correction.

12 Claims, 6 Drawing Sheets

ABERRATION CORRECTING APPARATUS, OPTICAL PICKUP, AND ABERRATION CORRECTING METHOD

This application is the U.S. national phase of International Application No. PCT/JP2006/306532 filed 29 Mar. 2006 which designated the U.S. and claims priority to Japanese Patent Application No. 2005-095908 filed 29 Mar. 2005, the entire contents of each of which are hereby incorporated by reference.

TECHNICAL FIELD

The present invention relates to an aberration correcting apparatus which corrects aberration of a light beam used for information recording or reading with respect to an optical disc, an optical pickup provided with the aberration correcting apparatus, and an aberration correcting method.

BACKGROUND ART

There has been spread of a various types of optical discs, such as a DVD and a CD (Compact Disc). The DVD includes a DVD-ROM (DVD-Read Only Memory) for read only, a DVD-R (DVD-Recordable) of a write-once type, a DVD-RW (DVD-ReWritable) of a rewritable type, a DVD-RAM (DVD-Random Access Memory) of a rewritable type, and the like. Moreover, there are also a dual-layer DVD-ROM and a dual-layer DVD-R having two recording layers. Moreover, the CD also includes a CD-ROM for read-only and for computers, a CD-DA (Compact Disc Digital Audio) for read only and for music, a write-once type CD-R, a rewritable type CD-RW, and the like.

Moreover, there has been spread of a disc drive which is integrally provided with a function for information recording or reading with respect to a plurality types of optical discs. Such a disc drive is referred to as a multidisc drive or a multi drive. For example, there has been spread of a multidisc drive for DVD/CD, which is integrally provided with a function for the information recording or reading with respect to almost all of the above-listed optical discs.

Most of the multidisc drives are provided with an optical pickup which is integrally provided with a structure for information recording or reading with respect to a plurality types of optical discs. For example, most of the multidisc drives for DVD/CD are provided with an optical pickup for DVD/CD. As this type of optical pickup, there is listed an optical pickup provided with a structure for focusing a plurality of light beams on an optical disc by using one objective lens. That is, this type of optical pickup is provided with a plurality of light sources corresponding to the types of the optical discs, converts the optical axes of the light beams outputted from the respective light sources to a unified optical axis, and focuses the light beams on the optical disc by using one objective lens which is disposed to cross the unified optical axis.

By the way, the DVD has a higher recording density than the CD. In order to ensure stability or accuracy in the information recording or reading, it is desirable to correct spherical aberration, coma aberration, or the like of the light beam for DVD in the optical pickup. Some of the optical pickups for DVD/CD which are currently popular are provided with an aberration correcting apparatus which uses a liquid crystal (LC) to correct the spherical aberration, the coma aberration or the like of the light beam for DVD. The aberration correcting apparatus is provided, for example, with a LC optical element and a LC driver for driving the LC optical element. The LC optical element is normally located on the incident side of the objective lens and is disposed to cross the unified optical axis. The LC optical element has two electrode layers which are arranged to face each other with the LC therebetween. By applying voltages to the electrodes formed in the electrode layers, it is possible to change LC orientation, LC refractive index, and an optical path length of the light beam which passes through the LC. By this, it is possible to uniform the wavefront of the light beam for DVD and to correct the spherical aberration, the coma aberration, or the like of the light beam for DVD.

On the other hand, the CD has a lower recording density than the DVD, so it has been generally considered that it is only necessary to correct the coma aberration of the light beam for CD. In fact, the aberration correcting apparatus provided for the optical pickups for DVD/CD which are currently popular has only a function for correcting the coma aberration of the light beam for CD.

However, the widespread CD has allowed the presence of the CD with a variety of thicknesses of a protection layer on the side that the light beam is irradiated. In view of the present situation, it is also desirable to correct the spherical aberration of the light beam for CD.

Moreover, there tend to be more types of optical discs which record or read the information by using one optical pickup, and this complicates the optical system of the optical pickup. Furthermore, it is also required to make the optical system of the optical pickup highly accurate in order to realize the information recording or the like with respect to the dual-layer DVD-R. In view of the present situation, it is desirable to correct astigmatism aberration at least for the light beam for DVD.

In order to respond the aforementioned demands, it is ideally desirable to provide one aberration correcting apparatus with a function that corrects each of the spherical aberration, the coma aberration, and the astigmatism aberration for each of the plurality of light beams corresponding to the plurality types of optical discs. This, however, has the following problem.

That is, if the spherical aberration, the coma aberration, and the astigmatism aberration are corrected with respect to one light beam, the amount of a change in the optical path length of the light beam is partially increased. For example, if the spherical aberration, the coma aberration, and the astigmatism aberration are corrected for a certain light beam, there possibly arises the situation that a certain part of the optical path length of the light beam is changed triply in the same direction. In this case, the portion which is changed triply in the light beam has a considerably large amount of change in the optical path length, compared with the other portion.

The LC optical element, however, which is used for the aberration correcting apparatus, has a limited range in which the optical path length of the light beam can be partially changed (hereinafter referred to as a "optical-path-length changeable range"). Thus, in some cases, all of the spherical aberration, the coma aberration, and the astigmatism aberration cannot be corrected completely for one light beam. For example, if a certain part of the optical path length of a certain light beam is firstly changed in order to correct the spherical aberration and the same part of the optical path length of the light beam is secondly changed in the same direction in order to correct the coma aberration, the actual amount of the change in the optical path length of the light beam reaches the limit of the optical-path-length changeable range at this stage, so that there possibly arises the situation that the astigmatism aberration, which is scheduled to be performed next, cannot be corrected.

Moreover, the importance of the aberration correction varies depending on the type of the aberration, such as the spherical aberration, the coma aberration, and the astigmatism aberration. Furthermore, the order of the importance of the aberration correction varies depending on the type of the optical disc. For example, the descending order of the importance of the correction aberrations regarding the DVD-RAM is the astigmatism aberration, the spherical aberration, and the coma aberration. The descending order of the importance of the correction aberrations regarding the dual-layer DVD-R is the spherical aberration, the coma aberration, and the astigmatism aberration. Moreover, in the case of the CD-R, it is perceived that the spherical aberration needs to be corrected as described above; however, the coma aberration is most important in the aberration correction. In this case, if the aberration is corrected in the order of the spherical aberration, the coma aberration, and the astigmatism aberration, there is a possibility that the astigmatism aberration, which is most important for the DVD-RAM, cannot be sufficiently corrected. On the other hand, in order to avoid such a disadvantage, if the aberration is corrected in the order of the astigmatism aberration, the coma aberration, and the spherical aberration, there is a possibility that the spherical aberration, which is most important for the dual-layer DVD-R, cannot be sufficiently corrected. On the other hand, in order to avoid these disadvantages, if the aberration is corrected in the order of the spherical aberration, the astigmatism aberration, and the coma aberration, there is a possibility that the coma aberration, which is most important for the CD-R, cannot be sufficiently corrected.

As described above, since the LC optical element used for the aberration correcting apparatus has the limited optical-path-length changeable range, it is difficult to provide one aberration correcting apparatus with the function that corrects each of the spherical aberration, the coma aberration, and the astigmatism aberration for each of the plurality of light beams corresponding to the plurality types of optical discs.

Incidentally, in order to overcome the difficulty, it is considered to expand the optical-path-length changeable range in the LC optical element used for the aberration correcting apparatus. The expansion of the optical-path-length changeable range can be realized by thickening the LC of the LC optical element.

However, thickening the LC slows down the response of the LC, which increases a time length for the aberration correction. At least the spherical aberration and the astigmatism aberration need to be corrected before the information recording or reading is started with respect to the optical disc. Thus, if the time length for the aberration correction is increased, there is such a problem that it takes a longer time to start the information recording or reproduction after the optical disc is inserted in the disc drive. Therefore, it is not desirable to expand the optical-path-length changeable range by thickening the LC.

The aforementioned problem can also occur on the aberration correcting apparatus which uses not the LC optical element but another optical element.

In order to solve the above-mentioned problems, it is therefore a first object of the present invention to provide an aberration correcting apparatus, an optical pickup and a aberration correcting method, which allow effective aberration correction for a plurality of light beams corresponding to a plurality types of optical discs, to thereby ensure stability or appropriate accuracy in information recording or reading with respect to the plurality types of optical discs.

It is a second object of the present invention to provide an aberration correcting apparatus, an optical pickup and an aberration correcting method, which can perform the aberration correction on a plurality of light beams corresponding to a plurality types of optical discs, in accordance with the importance, without expanding the optical-path-length changeable range of an optical element which performs the aberration correction.

Means for Solving the Subject

The above object of the present invention can be achieved by a first aberration correcting apparatus for correcting aberration of a light beam for information recording or reading with respect to an optical disc, provided with: an optical element which is disposed to cross an optical axis of the light beam irradiated onto the optical disc and which can partially change an optical path length of the light beam; a disc judging device for judging a type of the optical disc; a rank setting device for setting a rank corresponding to the type of the optical disc judged by the disc judging device, for each of spherical aberration, coma aberration, and astigmatism aberration; and an optical-element controlling device for controlling a partial change in the optical path length of the light beam on the optical element to remove or reduce the spherical aberration, the coma aberration, and the astigmatism aberration in order in accordance with the rank set by the rank setting device.

The above object of the present invention can be also achieved by a second aberration correcting apparatus for correcting aberration of a light beam for information recording or reading with respect to an optical disc, provided with: an optical element which is disposed to cross an optical axis of the light beam irradiated onto the optical disc and which can partially change an optical path length of the light beam; a disc judging device for judging a type of the optical disc; a rank setting device for selecting two types of aberrations corresponding to the type of the optical disc judged by the disc judging device, from spherical aberration, coma aberration, and astigmatism aberration and for setting a rank corresponding to the type of the optical disc judged by the disc judging device, for each of the selected two types of aberrations; and an optical-element controlling device for controlling a partial change in the optical path length of the light beam on the optical element to remove or reduce the two types of aberrations selected by the rank setting device in order in accordance with the rank set by the rank setting device.

The above object of the present invention can be also achieved by a third aberration correcting apparatus for correcting aberration of a light beam for information recording or reading with respect to an optical disc, provided with: an optical element which is disposed to cross an optical axis of the light beam irradiated onto the optical disc and which can partially change an optical path length of the light beam; a disc judging device for judging a type of the optical disc; an aberration selecting device for selecting one type of aberration corresponding to the type of the optical disc judged by the disc judging device, from any two types or all of spherical aberration, coma aberration, and astigmatism aberration; and an optical-element controlling device for controlling a partial change in the optical path length of the light beam on the optical element to remove or reduce the aberration selected by the rank setting device.

The above object of the present invention can be also achieved by an optical pickup provided with any one of the first to third aberration correcting apparatus of the present invention.

The above object of the present invention can be also achieved by a first aberration correcting method of correcting aberration of a light beam by controlling an optical element which is disposed to cross an optical axis of the light beam irradiated onto an optical disc for information recording or reproduction with respect to the optical disc and which can partially change an optical path length of the light beam, the aberration correction method provided with: a disc judging process of judging a type of the optical disc; a rank setting process of setting a rank corresponding to the type of the optical disc judged in the disc judging process, for each of spherical aberration, coma aberration, and astigmatism aberration; and an optical-element controlling process of controlling a partial change in the optical path length of the light beam on the optical element to remove or reduce the spherical aberration, the coma aberration, and the astigmatism aberration in order in accordance with the rank set in the rank setting process.

The above object of the present invention can be also achieved by a second aberration correcting method of correcting aberration of a light beam by controlling an optical element which is disposed to cross an optical axis of the light beam irradiated onto an optical disc for information recording or reproduction with respect to the optical disc and which can partially change an optical path length of the light beam, the aberration correcting method provided with: a disc judging process of judging a type of the optical disc; a rank setting process of selecting two types of aberrations corresponding to the type of the optical disc judged in the disc judging process, from spherical aberration, coma aberration, and astigmatism aberration and for setting a rank corresponding to the type of the optical disc judged in the disc judging process, for each of the selected two types of aberrations; and an optical-element controlling process of controlling a partial change in the optical path length of the light beam on the optical element to remove or reduce the two types of aberrations selected in the rank setting process in order in accordance with the rank set in the rank setting process.

The above object of the present invention can be also achieved by a third aberration correcting method of correcting aberration of a light beam by controlling an optical element which is disposed to cross an optical axis of the light beam irradiated onto an optical disc for information recording or reading with respect to the optical disc and which can partially change an optical path length of the light beam, the aberration correcting method provided with: a disc judging process of judging a type of the optical disc; an aberration selecting process of selecting one type of aberration corresponding to the type of the optical disc judged in the disc judging process, from any two types or all of spherical aberration, coma aberration, and astigmatism aberration; and an optical-element controlling process of controlling a partial change in the optical path length of the light beam on the optical element to remove or reduce the aberration selected in the rank setting process.

These effects and other advantages of the present invention will become more apparent from the embodiment explained below.

BRIEF DESCRIPTION OF DRAWINGS

FIG. 7 is an explanatory diagram showing a change in the wavefront of a light beam and an optical-path-length changeable range and the like.

DESCRIPTION OF REFERENCE CODES

1 optical pickup
16 aberration correcting apparatus
21 liquid crystal optical element
23, 81 microcomputer
33, 34 electrode layer
37 liquid crystal
41 to 46, 51 to 60 electrode
71 disc judging device
72 rank setting device
73 memory device
74 driving control device
82 aberration selecting device

BEST MODE FOR CARRYING OUT THE INVENTION

Hereinafter, the best mode for carrying out the present invention will be explained in each embodiment in order with reference to the drawings.

First Embodiment

Figure 1:
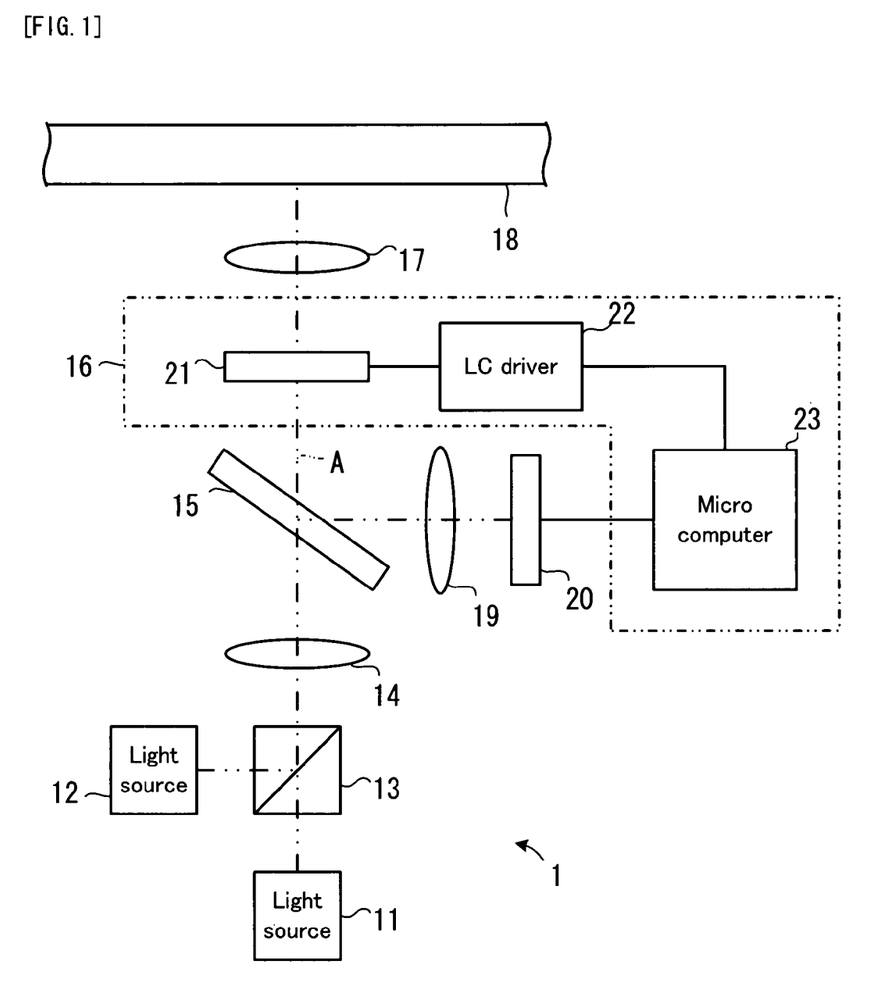
FIG. 1 is an explanatory diagram showing an embodiment of the optical pickup in the present invention.

An aberration correcting apparatus in a first embodiment of the present invention can be used for an optical pickup for DVD/CD. FIG. 1 shows the structure of the optical pickup for DVD/CD. As shown in FIG. 1, an optical pickup 1 switches between a light beam for DVD and a light beam for CD, to thereby focus the light beam for DVD on a DVD and the light beam for CD on a CD by using one objective lens 17 and perform information recording and reading on the DVD and the CD.

That is, when the information recording or reading is performed on the DVD, for example, a light beam with a wavelength of 660 nm is outputted from a semiconductor laser light source 11 for DVD. The light beam passes through a dichroic prism 13 and enters a collimator lens 14. Then, the light beam for DVD is converted to parallel light by the collimator lens 14, and it passes through a half mirror 15 and travels along a unified optical axis A. Then, the light beam for DVD enters a LC optical element 21 of an aberration correcting apparatus 16. The aberration correcting apparatus 16 corrects the aberrations of the light beam for DVD. The light beam for DVD in which the aberrations are corrected is focused on a recording surface of an optical disc 18 (DVD) by the objective lens 17. Then, the light beam is reflected by the recording surface of the optical disc 18. The reflected light passes through the objective lens 17 and the LC optical element 21 and enters the half mirror 15. Then, the reflected light is turned around by the half mirror 15 and is focused on a light receiving surface of a light receiving element 20 by a condenser lens 19.

On the other hand, when the information recording or reading is performed on the CD a, for example, a light beam with a wavelength of 780 nm is outputted from a semiconductor laser light source 12 for CD. The light beam is turned around by the dichroic prism 13 and enters the collimator lens 14. Then, the light beam for CD is converted to parallel light by the collimator lens 14, and it passes through the half mirror 15 and travels along the unified optical axis A. Then, the light beam for CD enters the LC optical element 21 of the aberration correcting apparatus 16. The aberration correcting apparatus 16 corrects the aberrations of the light beam for CD. The light beam for CD in which the aberrations are corrected is focused on the recording surface of the optical disc 18 (CD) by the objective lens 17. Then, the light beam is reflected by the recording surface of the optical disc 18. The reflected light follows the same route as that of the reflected light of the light beam for DVD and reaches to the light receiving surface of the light receiving element 20.

Figure 2:
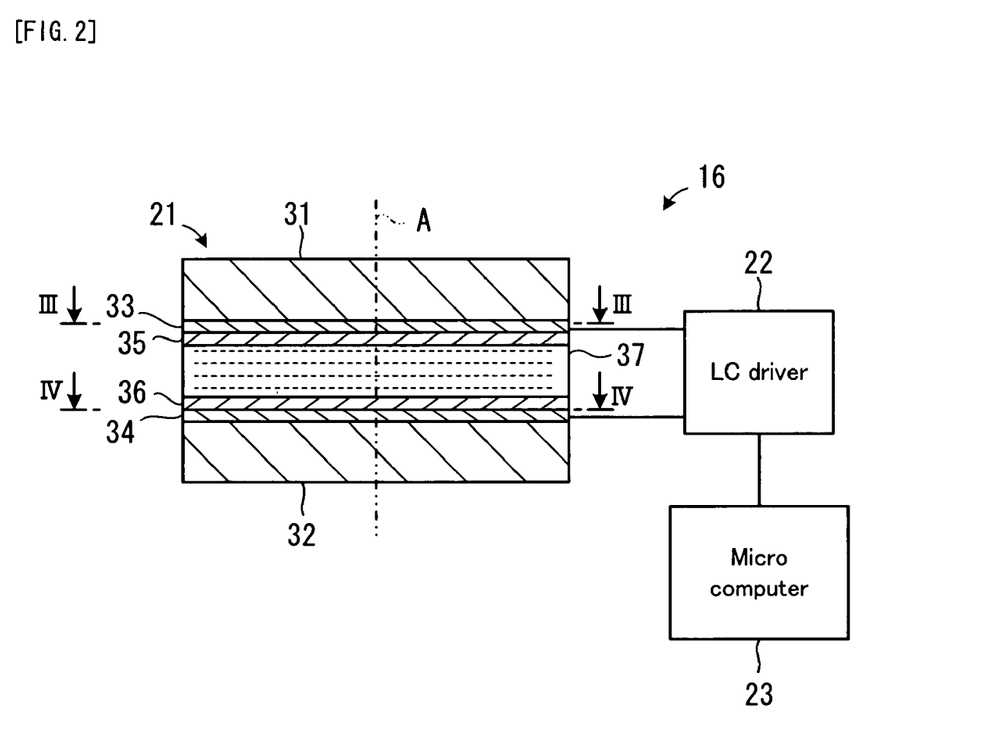
FIG. 2 is an explanatory diagram showing a first embodiment of the aberration correcting apparatus in the present invention.

FIG. 2 shows the structure of the aberration correcting apparatus 16 in FIG. 1, namely, the aberration correcting apparatus in the first embodiment of the present invention.

The aberration correcting apparatus 16, as shown in FIG. 2, is provided with: the LC optical element 21; a LC driver 22; and a microcomputer 23.

The LC optical element 21 is disposed to cross the unified optical axis A on which an optical axis of the light beam for DVD matches an optical axis of the light beam for CD. The LC optical element 21 is provided with: substrates 31 and 32; electrode layers 33 and 34; oriented films 35 and 36; and a LC 37. The substrates 31 and 32 are transparent flat plates and are formed of a glass material, for example. The electrode layers 33 and 34 are formed on the inner surfaces of the substrates 31 and 32, respectively. The electrode layers 33 and 34 cross the unified optical axis A and face each other with the LC 37 therebetween. The electrode layers 33 and 34 are transparent thin films and are formed of ITO (Indium Tin Oxide or the like. Moreover, the electrode layers 33 and 34 have a plurality of electrodes formed therein. The oriented films 35 and 36 are thin films which provide predetermined molecular orientation for the LC 37. The LC 37 is a material which is characterized in that the molecular orientation is changed by applying a voltage. That is, if voltages are applied to the electrodes, which are formed in the electrode layers 33 and 34, to thereby apply a voltage to the LC 37, the voltage application changes the orientation of LC molecules and the refractive index of the LC. This allows a partial change in the optical path length (or phase) of the light beam which passes through the LC 37, and this also uniforms the wavefront of the light beam. Incidentally, the LC optical element 21 is a specific example of the optical element.

The LC driver 22 follows the control of the microcomputer 23 and applies a voltage to each of the plurality of electrodes formed in the electrode layers 33 and 34. The LC driver 22 is electrically connected to each of the electrodes formed in the electrode layers 33 and 34. The LC driver 22 is provided, for example, with a voltage-generation circuit for generating an applied voltage; a voltage-setting circuit for setting and changing a value of the applied voltage generated by the voltage-generation circuit under the control of the microcomputer 23; and the like. Incidentally, the microcomputer 23 will be explained later by suing FIG. 5.

Figure 3:
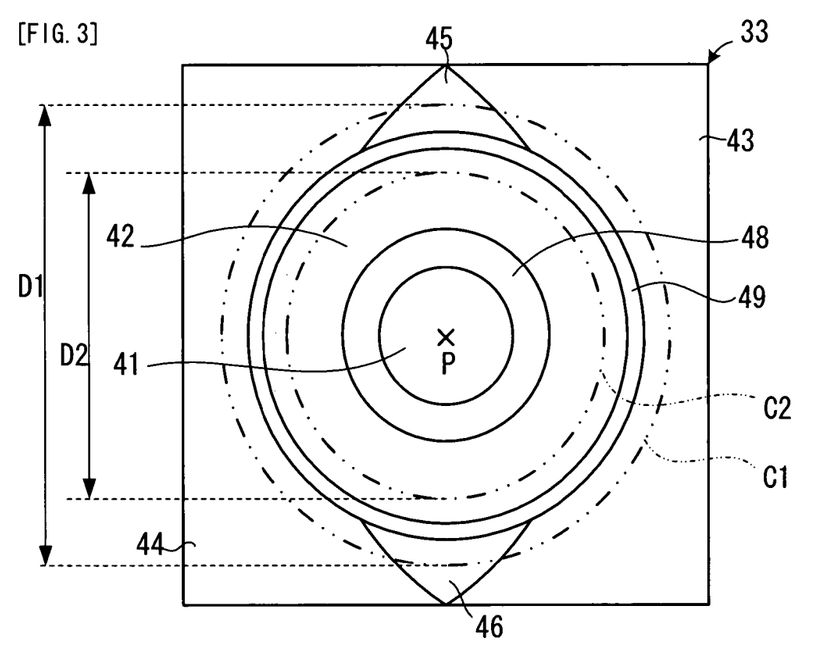
FIG. 3 is a plan view in which one of the electrode layers of the aberration correcting apparatus is observed in an arrow III-III direction in FIG. 2.

FIG. 3 is a view showing the LC optical element 21 observed in an arrow III-III direction in FIG. 2 and shows an electrode pattern formed in the electrode layer 33. In FIG. 3, it is assumed that the electrode layer 33 and the unified optical axis A cross at a point P. It is also assumed that a circle whose central point is the point P and whose diameter is substantially equal to an effective diameter D1 associated with the DVD is a circle C1. It is also assumed that a circle whose central point is the point P and whose diameter is substantially equal to an effective diameter D2 (D2<D1) associated with the CD is a circle C2.

As shown in FIG. 3, the electrode layer 33 has transparent electrodes 41, 42, 43, 44, 45, and 46 formed therein. These electrodes are electrically insulated from each other and can control the voltage application independently. The electrode 41 is circular, is located on the inner side of the circle C1 and the circle C2, and is also disposed on the point P. The electrode 42 is annular, is located on the inner side of the circle C1, and is disposed concentrically to the electrode 41 so as to surround the electrode 41. The electrodes 43, 44, 45, and 46 are substantially annular if the electrodes are observed as a unified electrode group, overlap the circumference of the circle C1, and are disposed concentrically to the electrodes 41 and 42 so as to surround the electrode 42. The electrodes 43 and 44 are shaped and arranged to be substantially symmetric with respect to the point P. Between the electrode 41 and the electrode 42, there is formed a transparent annular gap 48. Between the electrode 42 and the electrode group which consists of the electrodes 43, 44, 45, and 46, there is formed a transparent annular gap 49. A voltage is not applied to the annular gaps 48 and 49, or a voltage is always applied thereto in a certain polarity and to a certain extent.

Figure 4:
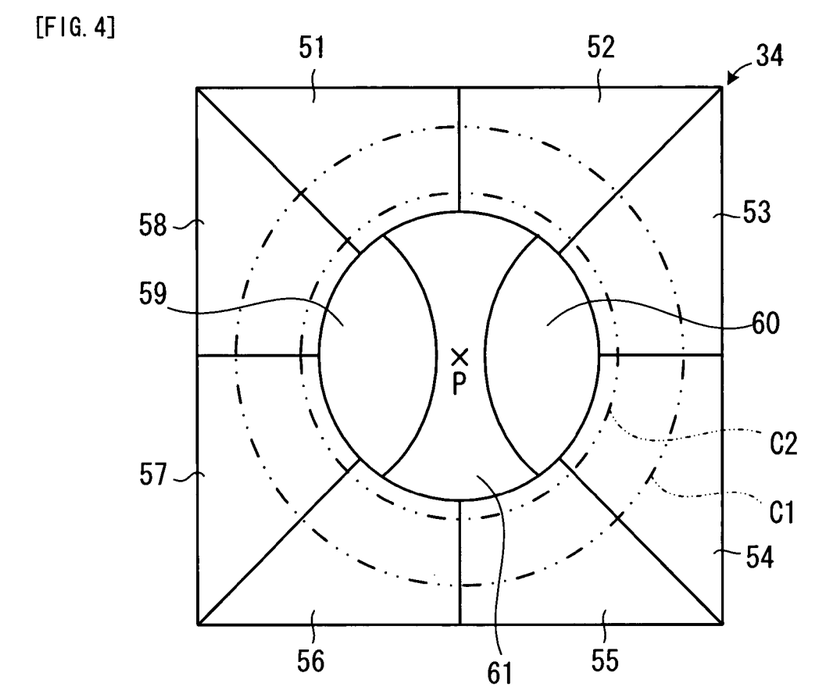
FIG. 4 is a plan view in which the other electrode layer of the aberration correcting apparatus is observed in an arrow IV-IV direction in FIG. 2.

FIG. 4 is a view showing the LC optical element 21 observed in an arrow IV-IV direction in FIG. 2 and shows an electrode pattern formed in the electrode layer 34. In FIG. 4, as in FIG. 3, it is assumed that the electrode layer 34 and the unified optical axis A cross at a point P. It is also assumed that a circle whose central point is the point P and whose diameter is substantially equal to an effective diameter D1 associated with the DVD is a circle C1. It is also assumed that a circle whose central point is the point P and whose diameter is substantially equal to an effective diameter D2 associated with the CD is a circle C2.

As shown in FIG. 4, the electrode layer 34 has transparent electrodes 51, 52, 53, 54, 55, 56, 57, 58, 59, and 60 formed therein. These electrodes are electrically insulated from each other and can control the voltage application independently. The electrodes 51 to 58 partially overlap the circumference of the circle C1 and the circumference of the circle C2, and the electrodes are also arranged along the circumference of the circle C1 and the circumference of the circle C2. The electrodes 51 to 58 exist on the outer circumferential side of the electrode layer 34 and do not exist on the inner circumferential side of the electrode layer 34. The electrodes 59 and 60 are disposed on the inner side of the circle C1 and on the inner circumferential side of the electrode layer 34. The electrodes 59 and 60 are shaped and arranged to be substantially symmetric with respect to the point P. The electrode layer 34 has a transparent space area 61 formed on the center thereof A voltage is not applied to the space area 61, or a voltage is always applied thereto in a certain polarity and to a certain extent.

The aberration correcting apparatus 16 can correct spherical aberration, coma aberration, and astigmatism aberration for the DVD and the CD. Firstly, when the spherical aberration of the DVD is corrected, the LC driver 22 controls the voltage application to the electrode 41, the electrode 42, and the electrode group which consists of the electrodes 43 to 46, which are formed in the electrode layer 33. At this time, the LC driver 22 applies voltages in the same polarity and to the same extent, to the electrodes 43 to 46. Next, when the spherical aberration of the CD is corrected, the LC driver 22 controls the voltage application to the electrode 41, which is formed in the electrode 33, and the electrode group which consists of the electrodes 51 to 58, which are formed in the electrode layer 34. At this time, the LC driver 22 applies voltages in the same polarity and to the same extent, to the electrodes 51 to 58. Next, when the coma aberration of the DVD and the CD is corrected, the LC driver 22 controls the voltage application to the electrodes 43 and 44, which are formed in the electrode 33, and the electrodes 59 and 60, which are formed in the electrode layer 34. Next, when the astigmatism aberration of the DVD and the CD is corrected, the LC driver 22 controls the voltage application to the electrodes 51 to 58, which are formed in the electrode layer 34.

Now a supplementary explanation is given on the correction of the spherical aberration of the CD. When the spherical aberration of the CD is corrected, what are used are the electrode 41, which is formed in the electrode layer 33, and the electrode group which consists of the electrodes 51 to 58, which are formed in the electrode layer 34. As shown in FIG. 3, the electrode 41 is located on the inner side of the circle C2 and on the point P. As shown in FIG. 4, the electrode group which consists of the electrodes 51 to 58 overlaps the circumference of the circle C2. Moreover, as is seen from overlapping of the electrode layer 33 in FIG. 3 and the electrode layer 34 in FIG. 4, there is a substantially annular area between the electrode 41 and the electrode group which consists of the electrodes 51 to 58 (hereinafter referred to has a "not-applied area") in which a voltage is not applied to the LC by the electrode application to the electrode 41 and the electrode group which consists of the electrodes 51 to 58. When the spherical aberration of the CD is corrected, the LC driver 22 controls the voltage application to the electrode 41 and the electrode group which consists of the electrodes 51 to 58 so that the wavefront of the light beam corresponding to the electrode 41 and the wavefront of the light beam corresponding to the electrode group which consists of the electrodes 51 to 58 substantially match the wavefront of the light beam corresponding to the not-applied area. In other words, the electrode 41 corresponds to the central portion of the light beam. The electrode group which consists of the electrodes 51 to 58 corresponds to the outer circumferential portion of the light beam. The not-applied area corresponds to a middle annular portion located between the central portion and the outer circumferential portion of the light beam. The LC driver 22 controls the voltage application only to the electrode 41 and the electrode group which consists of the electrodes 51 to 58, so that a voltage is not applied to the not-applied area, or a voltage is maintained in the same polarity and to the same extent. As a result, the wavefront does not change in the middle annular portion of the light beam. On the other hand, the LC driver 22 controls the voltage application to the electrode 41 and the electrode group which consists of the electrodes 51 to 58, by which the wavefront of the central portion and the wave front of the external portion of the light beam change so as to substantially match the wavefront of the middle annular portion of the light beam. In this manner, it is possible to correct the spherical aberration with respect to the CD.

Figure 5:
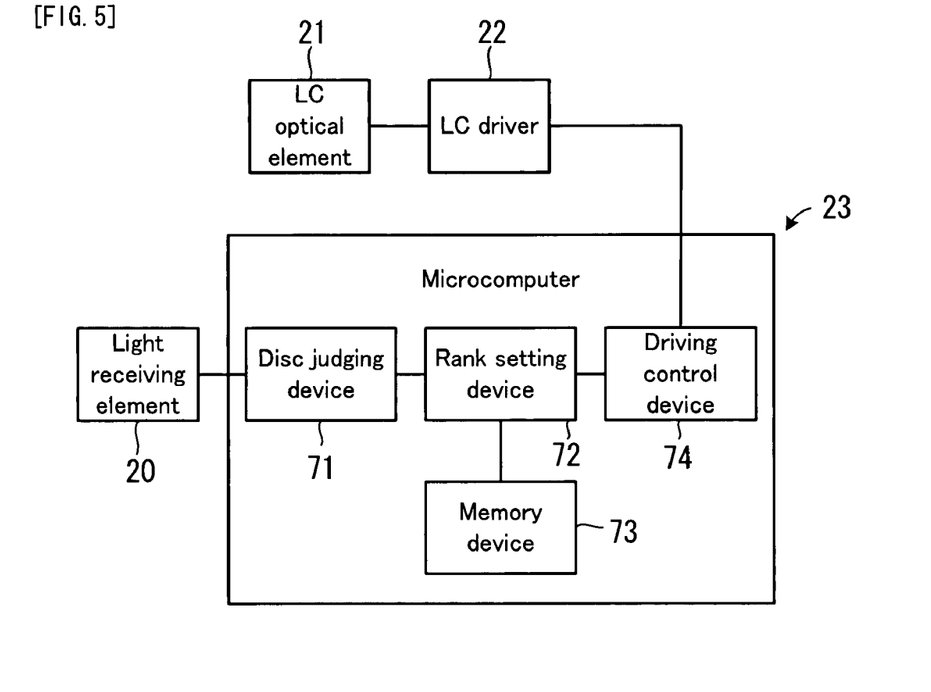
FIG. 5 is a block diagram showing the inner structure of a microcomputer in FIG. 2.

FIG. 5 shows the inner structure of the microcomputer 23 in the aberration correcting apparatus 16. The microcomputer 23 selects the aberration and sets the aberration rank depending on the type of the optical disc 18. Then, the microcomputer 23 controls the LC driver 22 in accordance with the selected aberration and the set aberration rank, and controls the voltage application to each of the electrodes 41 to 46 and 51 to 60 of the LC optical element 21, to thereby sequentially execute the two or three types of aberration corrections. The microcomputer 23 is provided with: a disc judging device 71; a rank setting device 72; a memory device 73; and a driving control device 74, as shown in FIG. 5.

The disc judging device 71 judges the type of the optical disc 18. For example, the microcomputer 23 controls the optical pickup 1, irradiates the optical disc 18 with the light beam, vertically displaces the focus position of the light beam, and detects the amplitude and the number of S-shaped curves of a focus error signal obtained by the vertical displacement. The disc judging device 71 judges the type of the currently inserted optical disc 18 on the basis of the extent of the amplitude and the number of the S-shaped curves. Incidentally, in order to increase an accuracy of judging the type of the optical disc 18, in addition to the method of detecting the extent of the amplitude and the number of the S-shaped curves, it is possible to employ a method of measuring the quantity of light when the light beam is focused on the recording surface of the optical disc 18. Moreover, disc information recorded on the optical disc 18 may be read to judge the type of the optical disc 18. The type of the optical disc 18 includes a DVD-ROM, DVD-R, DVD-RW, DVD-RAM, dual layer DVD-ROM, dual-layer DVD-R, CD-ROM, CD-R, CD-RW, and the like.

The rank setting device 72 sets the rank corresponding to the type of the optical disc 18 judged by the disc judging device 71, for each of the spherical aberration, the coma aberration, and the astigmatism aberration. Moreover, the rank setting device 72 selects the two types of aberrations corresponding to the type of the optical disc 18 judged by the disc judging device 71, from among the spherical aberration, the coma aberration, and the astigmatism aberration. The rank setting device 72 also selects the rank corresponding to the type of the optical disc 18 judged by the disc judging device 71, for each of the selected two types of aberrations. The rank setting device 72 refers to a rank setting table stored in the memory device 73 to thereby select the aberration and set the aberration rank on the basis of the rank setting table.

The memory device 73 is provided with a memory element, such as a semiconductor memory, or a recording medium, such as a hard disk.

Figure 6:
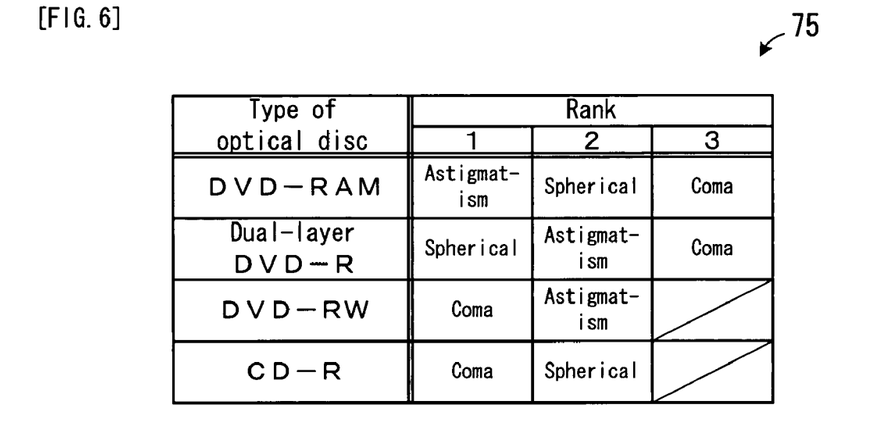
FIG. 6 is an explanatory diagram showing one example of a rank setting table.

FIG. 6 shows one example of the rank setting table. On a rank setting table 75, there is recorded information which indicates a correspondence relationship between the aberration rank to be set and the type of the optical disc, and information which indicates a correspondence relationship between the two types of aberrations to be selected and the type of the optical disc. For example, as shown in FIG. 6, on the rank setting table 75, there is recorded information which indicates the rank of the three types of aberrations to be set, for each of the DVD-RAM and the dual-layer DVD-R. Moreover, there is recorded information which indicates the two types of aberrations to be selected and information which indicates the rank of the two types of aberrations to be set, for each of the DVD-RW and the CD-R.

The importance of the aberration correction varies depending on the type of the aberration, such as the spherical aberration, the coma aberration, and the astigmatism aberration. Moreover, the order of the importance of the aberration correction varies depending on the type of the optical disc. The descending order of the importance of the aberration corrections regarding the DVD-RAM is the astigmatism aberration, the spherical aberration, and the coma aberration. The descending order of the importance of the aberration corrections regarding the dual-layer DVD-R is the spherical aberration, the astigmatism aberration, and the coma aberration.

The descending order of the importance of the aberration corrections regarding the DVD-RW is the coma aberration, the astigmatism aberration, and the spherical aberration. The spherical aberration correction regarding the DVD-RW is least important, so that it can be omitted. The descending order of the importance of the aberration corrections regarding the CD-R is the coma aberration, the spherical aberration, and the astigmatism aberration. The astigmatism aberration correction regarding the CD-R is least important, so that it can be omitted. For example, on the rank setting table 75, there is recorded the aberration rank, which is determined in advance in accordance with the descending order of the importance of the aberration corrections, for each type of the optical discs. Moreover, on the rank setting table 75, there is recorded the rank of the three types of aberrations, for the optical disc which needs the aberration correction for all the three types of aberrations. There is also recorded the rank of the two types of aberrations, for the optical disc which needs the aberration correction for the two types of aberrations and on which the aberration correction can be omitted for the remaining one type. The aberration rank, which is set by the rank setting device 72 on the basis of the rank setting table 75, is the descending order of the importance of the aberration corrections for the optical disc 18 judged by the disc judging device 71.

Back in FIG. 5 again, the driving control device 74 controls a partial change in the optical path length of the light beam on the LC optical element 21 to remove or reduce the spherical aberration, the coma aberration, and the astigmatism aberration in order in accordance with the aberration rank set by the rank setting device 72. Moreover, the driving control device 74 controls a partial change in the optical path length of the light beam on the LC optical element 21 to remove or reduce the two types of aberrations selected by the rank setting device 72 in order in accordance with the aberration rank set by the rank setting device 72. That is, the driving control device 74 performs the two or three types of aberration corrections in order in accordance with the rank of the two or three types of aberrations, which is set by the rank setting device 72. In other words, the driving control device 74 controls the LC driver 22 to perform the plurality types of aberration corrections in order and controls the voltage application to each electrode of the LC optical element 21. Incidentally, the driving control device 74 and the LC driver 22 are a specific example of the optical-element controlling device.

The operation of the aberration correction process of the microcomputer 23 is as follows. When a user inserts the optical disc 18 into a disc drive provided with the optical pickup 1, the disc judging device 71 immediately judges the type of the optical disc 18. Then, the rank setting device 72 refers to the rank setting table 75 stored in the memory device 73 to thereby set the aberration rank corresponding to the type of the optical disc 18, which is judged by the disc judging device 71. For example, if the optical disc 18 is the DVD-RAM, the rank setting device 72 sets the aberration rank as follows: first rank—the astigmatism aberration; second rank—the spherical aberration; and third rank—the coma aberration. Moreover, if the optical disc 18 is the dual-layer DVD-R, the rank setting device 72 sets the aberration rank as follows: first rank—the spherical aberration; second rank—the astigmatism aberration; and third rank—the coma aberration. Moreover, if the optical disc 18 is the DVD-RW, the rank setting device 72 sets the aberration rank as follows: first rank—the coma aberration; and second rank—the astigmatism aberration. Moreover, if the optical disc 18 is the CD-R, the rank setting device 72 sets the aberration rank as follows: first rank—the coma aberration; and second rank—the spherical aberration. Then, the driving control device 74 sequentially controls the LC driver 22 to perform the aberration corrections in order in accordance with the rank set by the rank setting device 72, and it sequentially controls the voltage application to each electrode of the LC optical element 21.

Figure 7:
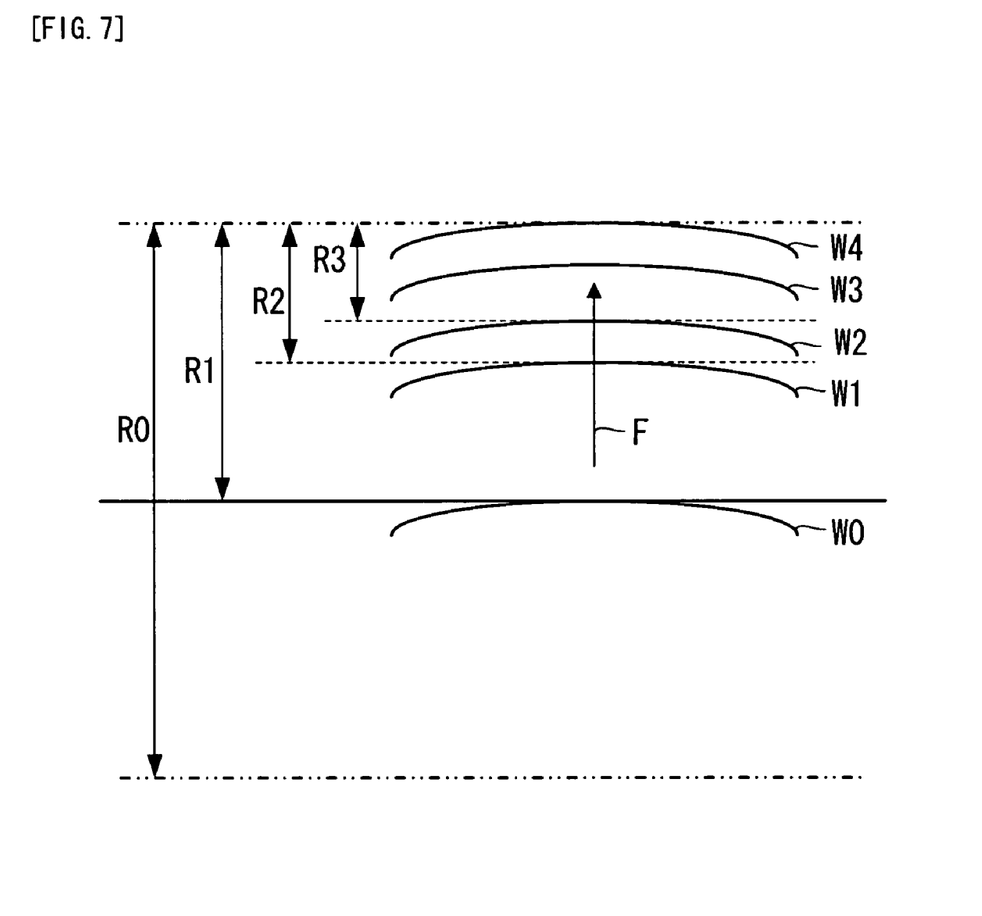

FIG. 7 shows a change in the wavefront of a certain part of the light beam (or the partial change in the optical path length) when the aberration corrections for the DVD-RAM are performed in the order of the astigmatism aberration correction, the spherical aberration correction, and the coma aberration correction. In FIG. 7, the wavefront of the light beam can be changed in an optical-path-length changeable range R0 of the LC optical element 21. It is assumed that a certain part of the light beam has a wavefront W0 before the aberration corrections are performed. At this stage, the wavefront W0 can be changed in the range R1 in an arrow F direction in FIG. 7. This means that the wavefront W0 of the light beam can be displaced arbitrarily in the range R1 to correct the astigmatism aberration of the first rank.

If the aberration correction process is started, the aberration correction of the first rank is firstly corrected. As a result of the correction, it is assumed, for example, that the wavefront W0 is changed in the arrow F direction and becomes a wavefront W1. At this stage, the wavefront W1 can be changed in a range R2 in the arrow F direction. This means that the wavefront W1 of the light beam can be displaced arbitrarily in the range R2 to correct the spherical aberration of the second rank.

Then, the spherical aberration of the second rank is corrected. As a result of the correction, it is assumed, for example, that the wavefront W1 is changed in the arrow F direction and becomes a wavefront W2. At this stage, the wavefront W2 can be changed in a range R3 in the arrow F direction. This means that the wavefront W2 of the light beam can be displaced arbitrarily in the range R3 to correct the coma aberration of the third rank.

Then, the coma aberration of the third rank is corrected. If the coma aberration is small and the coma aberration correction allows the change in the arrow F direction in the wavefront W2 of the light beam to be included in the range R3, the wavefront W2 changes to the wavefront W3 as a result of the correction. This means that the coma aberration is sufficiently corrected. However, if the coma aberration is large and the coma aberration correction does not allow the change in the arrow F direction in the wavefront W2 of the light beam to be included in the range R3, the wavefront W2 changes only to a wavefront W4 as a result of the correction. That is, in this case, the wavefront W2 reaches the upper limit of the optical-path-length changeable range R0 and it is no longer possible to change the wavefront from the wavefront W4 in the arrow F direction. This means that the coma aberration is not sufficiently performed. The coma aberration correction, however, is less important than the astigmatism aberration correction and the spherical aberration correction. Therefore, even if the coma aberration is not sufficiently corrected, that has a less influence than when the astigmatism aberration or the spherical aberration is not sufficiently corrected. In other words, even if the coma aberration is not sufficiently corrected with regard to the DVD-RAM, if the astigmatism aberration and the spherical aberration are sufficiently corrected, then it is possible to ensure stability and good accuracy of the information recording or reading with respect to the DVD-RAM.

Here, it is to be noted that it is not so often to change the wavefront to the extent that the optical-path-length changeable range R0 is used up, as shown in FIG. 7. That is, this type of situation occurs when the large astigmatism aberration, the large spherical aberration, and the large coma aberration are simultaneously generated. Such a situation would be rare.

As explained above, the aberration correcting apparatus 16 judges the type of the optical disc 18, sets the aberration rank depending on the type of the optical disc 18, and corrects the aberrations of the light beam in order in accordance with the aberration rank. Then, if setting the aberration rank in accordance with the descending order of the importance of the aberration corrections depending on the judged type of the optical disc, the aberration correcting apparatus 16 can correct the aberration in the descending order of the importance of the aberration corrections depending on the judged type of the optical disc. Therefore, even if the optical-path-length changeable range which is necessary for all the aberration corrections regarding the optical disc 18 exceeds the optical-path-length changeable range of the LC optical driver 21, it is possible to sufficiently perform at least the aberration correction of the first rank, which is most important in the correction for the optical disc 18. Moreover, in most cases, the aberration correction of the second rank, which is the second most important in the correction for the optical disc 18, can be also sufficiently performed. Even if the aberration correction of the third rank cannot be sufficiently performed, the aberration correction is least important in the correction for the optical disc 18, so that the influence generated by the sufficient aberration correction (or influence on the stability and accuracy of the information recording or reading) is relatively small.

As described above, according to the aberration correcting apparatus 16, it can perform the aberration correction on the plurality of light beams corresponding to the plurality types of optical discs, in accordance with the importance, without expanding the optical-path-length changeable range of the LC optical element 21. Therefore, it is possible to effectively correct the aberrations of the plurality of light beams corresponding to the plurality types of optical discs, to thereby ensure the stability or appropriate accuracy of the information recording or reading with respect to the plurality types of optical discs.

Second Embodiment

Figure 8:
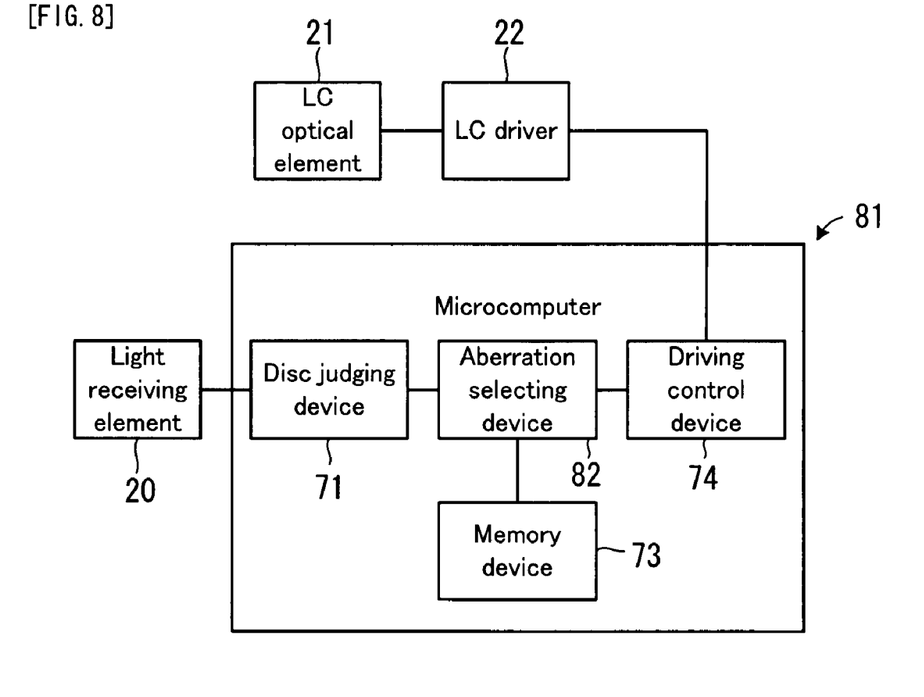
FIG. 8 is a block diagram showing the inner structure of a microcomputer in a second embodiment of the aberration correcting apparatus in the present invention.

FIG. 8 shows the inner structure of a microcomputer in a second embodiment of the aberration correcting apparatus in the present invention. The second embodiment of the present invention is characterized in that one type of aberration corresponding to the type of the optical disc is selected from any two types or all of the spherical aberration, the coma aberration, and the astigmatism aberration and that the selected aberration is corrected. Incidentally, in FIG. 7, the same constituent elements as those in the first embodiment of the aberration correcting apparatus (or the microcomputer) shown in FIG. 5 carry the same numerical references, and the explanation thereof will be omitted.

Figure 9:
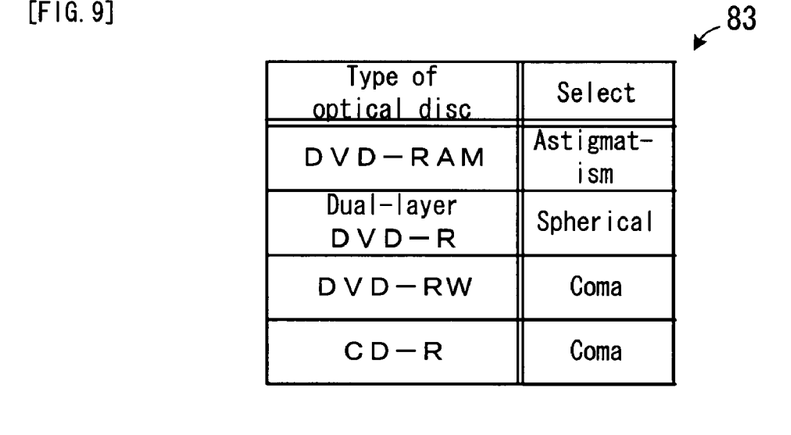
FIG. 9 is an explanatory diagram showing one example of an aberration-selecting table.

As shown in FIG. 8, a microcomputer 81 is provided with an aberration selecting device 82 instead of the rank setting device. The aberration selecting device 82 selects one type of aberration corresponding to the type of the optical disc judged by the disc judging device 71, from any two types or all of the spherical aberration, the coma aberration, and the astigmatism aberration. Moreover, the memory device 73 of the microcomputer 81 stores not the rank setting table but an aberration selecting table 83 as shown in FIG. 9. The aberration selecting device 82 refers to the aberration selecting table 83 stored in the memory device 73 to thereby select the aberration on the basis of the aberration selecting table 83. Then, the driving control device 74 controls a partial change in the optical path length of the light beam on the LC optical element 21 to remove or reduce the aberration selected by the aberration selecting device 82.

As shown in FIG. 9, on the aberration selecting table 83, there is recorded information which indicates a correspondence relationship between the aberration to be selected and the type of the optical disc. For example, on the aberration selecting table 83, there is recorded the type of the aberration which is most important in the aberration correction, for each type of the optical disc. The aberration selected by the aberration selecting device 82 on the basis of the aberration selecting table 83 is most important in the aberration correction for the optical disc 18 judged by the disc judging device 71.

The operation of the aberration correction process of the microcomputer 81 is as follows. When a user inserts the optical disc 18 into a disc drive provided with the optical pickup 1, the disc judging device 71 immediately judges the type of the optical disc 18. Then, the aberration selecting device 82 refers to the aberration selecting table 83 stored in the memory device 73 to thereby select the aberration corresponding to the type of the optical disc 18, which is judged by the disc judging device 71. For example, if the optical disc 18 is the DVD-RAM, the aberration selecting device 82 selects the astigmatism aberration. Moreover, if the optical disc 18 is the dual-layer DVD-R, the aberration selecting device 82 selects the spherical aberration. Moreover, if the optical disc 18 is the DVD-RW or the CD-R, the aberration selecting device 82 selects the coma aberration. Then, the driving control device 74 sequentially controls the LC driver 22 to perform the aberration correction selected by the aberration selecting device 82 and sequentially controls the voltage application to each electrode of the LC optical element 21.

As explained above, the aberration correcting apparatus in the second embodiment judges the type of the optical disc 18, selects the aberration depending on the type of the optical disc 18, and corrects the selected aberration for the light beam. Then, if selecting the aberration which is most important in the correction for the judged type of the optical disc, the aberration correcting apparatus in the second embodiment can surely correct the aberration which is most important in the correction depending on the type of the judged optical disc. That is, it is possible to prevent that the wavefront of the light beam approaches the limit of the optical-path-length changeable range of the LC optical element 21 because the aberration which is not so important in the correction for the judged optical disc is performed in advance and that the aberration which is most important in the correction for the optical disc is not sufficiently performed.

As described above, according to the aberration correcting apparatus in the second embodiment, it can perform the aberration correction on the plurality of light beams corresponding to the plurality types of optical discs, in accordance with the importance, without expanding the optical-path-length changeable range of the LC optical element 21. Therefore, it is possible to effectively correct the aberrations of the plurality of light beams corresponding to the plurality types of optical discs, to thereby ensure the stability or appropriate accuracy of the information recording or reading with respect to the plurality types of optical discs.

Incidentally, the shape, number, and arrangement of the plurality of electrodes formed in the electrode layers 33 and 34 of the LC optical element 21 are not limited to those shown in FIG. 3 and FIG. 4. For example, there may be formed three or more electrodes (or second electrodes) which are substantially annular and which are concentrically arranged to surround the electrode 41 in FIG. 3.

Moreover, in FIG. 3 and FIG. 4, with regard to the DVD, the electrodes used for the correction of the spherical aberration are formed in the electrode layer 33, the electrodes used for the correction of the astigmatism aberration are formed in the electrode layer 34, and the electrodes used for the correction of the come aberration are distributed and formed in the electrode layers 33 and 34. However, this arrangement relationship between the electrodes and the electrode layers is merely one example, and the present invention is not limited to this.

Moreover, how to use the electrodes for the spherical aberration correction regarding the CD described herein is merely one example. For example, an electrode pattern for the spherical aberration correction regarding the CD may be added to the electrode layers 33 and 34.

Moreover, the rank setting device 72 in FIG. 5 is explained by exemplifying the case that the aberration rank setting and the aberration selection are based on the rank setting table 75 stored in the memory device 73; however, the present invention is not limited to this. For example, the aberration rank setting and the aberration selection may be performed by a user's manual input. Moreover, the aberration rank setting and the aberration selection may be performed by recording the information which indicates the aberration rank to be set or the information which indicates the aberration to be selected onto the optical disc 18 and by reading this information from the optical disc 18 before the aberration correction. Moreover, the same is true for the aberration selection on the aberration selecting device 82 in FIG. 8.

Moreover, the LC optical element 21 is exemplified as the optical element which can partially change the optical path length of the light beam; however, the optical element of the present invention is not limited to the LC optical element.

Moreover, the aberration correcting apparatus of the present invention is not limited to the optical pickup for DVD/CD, and it can be also applied to another optical pickup provided with a structure which can be shared for the plurality of optical discs.

The present invention is not limited to the aforementioned embodiment, and various changes may be made without departing from the essence or spirit of the invention which can be read from the claims and the entire specification. An aberration correcting apparatus, an optical pickup, and an aberration correcting method, which involve such changes, are also intended to be within the technical scope of the present invention.

INDUSTRIAL APPLICABILITY

The aberration correcting apparatus, the optical pickup, and the aberration correcting method according to the present invention can be applied to an aberration correcting apparatus for correcting aberration of a light beam used for information recording or reading with respect to an optical disc, an optical pickup provided with the aberration correcting apparatus, and an aberration correcting method. on the reaction of the

The invention claimed is:

1. An aberration correcting apparatus for correcting aberration of a light beam for information recording or reading with respect to an optical disc, comprising:
   an optical element which is disposed to cross an optical axis of the light beam irradiated onto the optical disc and which can partially change an optical path length of the light beam;
   a disc judging device for judging a type of the optical disc;
   a rank setting device for setting a rank corresponding to the type of the optical disc judged by said disc judging device, for each of spherical aberration, coma aberration, and astigmatism aberration; and
   an optical-element controlling device for controlling a partial change in the optical path length of the light beam on said optical element to remove or reduce the spherical aberration, the coma aberration, and the astigmatism aberration in order in accordance with the rank set by said rank setting device.

2. The aberration correcting apparatus according to claim 1, wherein
   said aberration correcting apparatus further comprises a memory device which stores therein information which indicates a correspondence relationship between the rank of the aberration to be set and the type of the optical disc, and
   said rank setting device refers to the information stored in said memory device to thereby set the rank on the basis of the information.

3. The aberration correcting apparatus according to claim 1, wherein
   said optical element is a liquid crystal optical element comprises: a liquid crystal; two electrode layers facing each other with the liquid crystal therebetween; and a plurality of electrodes formed in each of the electrode layers, and
   said optical-element controlling device comprises a voltage-application controlling device for controlling a voltage application to the plurality of electrodes.

4. An optical pickup comprising the aberration correcting apparatus according to claim 1.

5. An aberration correcting apparatus for correcting aberration of a light beam for information recording or reading with respect to an optical disc, comprising:
   an optical element which is disposed to cross an optical axis of the light beam irradiated onto the optical disc and which can partially change an optical path length of the light beam;
   a disc judging device for judging a type of the optical disc;
   a rank setting device for selecting two types of aberrations corresponding to the type of the optical disc judged by said disc judging device, from spherical aberration, coma aberration, and astigmatism aberration and for setting a rank corresponding to the type of the optical disc judged by said disc judging device, for each of the selected two types of aberrations; and
   an optical-element controlling device for controlling a partial change in the optical path length of the light beam on said optical element to remove or reduce the two types of aberrations selected by said rank setting device in order in accordance with the rank set by said rank setting device.

6. The aberration correcting apparatus according to claim 5, wherein
   said aberration correcting apparatus further comprises a memory device which stores therein first information which indicates a correspondence relationship between the two types of aberrations to be selected and the type of the optical disc and second information which indicates a correspondence relationship between the rank of the aberration to be set and the type of the optical disc, and
   said rank setting device refers to the first information stored in said memory device to thereby select the aberration on the basis of the first information and refers to the second information stored in said memory device to thereby set the rank on the basis of the second information.

7. The aberration correcting apparatus according to claim 5, wherein
   said optical element is a liquid crystal optical element comprises: a liquid crystal; two electrode layers facing each other with the liquid crystal therebetween; and a plurality of electrodes formed in each of the electrode layers, and said optical-element controlling device comprises a voltage-application controlling device for controlling a voltage application to the plurality of electrodes.

8. An optical pickup comprising the aberration correcting apparatus according to claim 5.

9. An aberration correcting method of correcting aberration of a light beam by controlling an optical element which is disposed to cross an optical axis of the light beam irradiated onto an optical disc for information recording or reproduction with respect to the optical disc and which can partially change an optical path length of the light beam, said aberration correction method comprising:

a disc judging process of judging a type of the optical disc;

a rank setting process of setting a rank corresponding to the type of the optical disc judged in said disc judging process, for each of spherical aberration, coma aberration, and astigmatism aberration; and an optical-element controlling process of controlling a partial change in the optical path length of the light beam on said optical element to remove or reduce the spherical aberration, the coma aberration, and the astigmatism aberration in order in accordance with the rank set in said rank setting process.

10. The aberration correcting method according to claim 9, wherein said optical element is a liquid crystal optical element comprising: a liquid crystal; two electrode layers facing each other with the liquid crystal therebetween; and a plurality of electrodes formed in each of the electrode layers, and said optical-element controlling process comprises a voltage-application controlling process of controlling a voltage application to the plurality of electrodes.

11. An aberration correcting method of correcting aberration of a light beam by controlling an optical element which is disposed to cross an optical axis of the light beam irradiated onto an optical disc for information recording or reproduction with respect to the optical disc and which can partially change an optical path length of the light beam, said aberration correcting method comprising:

a disc judging process of judging a type of the optical disc;

a rank setting process of selecting two types of aberrations corresponding to the type of the optical disc judged in said disc judging process, from spherical aberration, coma aberration, and astigmatism aberration and for setting a rank corresponding to the type of the optical disc judged in said disc judging process, for each of the selected two types of aberrations; and an optical-element controlling process of controlling a partial change in the optical path length of the light beam on said optical element to remove or reduce the two types of aberrations selected in said rank setting process in order in accordance with the rank set in said rank setting process.

12. The aberration correcting apparatus according to claim 11, wherein said optical element is a liquid crystal optical element comprising: a liquid crystal; two electrode layers facing each other with the liquid crystal therebetween; and a plurality of electrodes formed in each of the electrode layers, and said optical-element controlling process comprises a voltage-application controlling process of controlling a voltage application to the plurality of electrodes.

* * * * *